United States Patent
Hofmann et al.

(10) Patent No.: US 7,252,337 B2
(45) Date of Patent: Aug. 7, 2007

(54) SEAT ARRANGEMENT FOR A MOTOR VEHICLE SEAT

(75) Inventors: Jochen Hofmann, Marktgraitz (DE); Jürgen Angermüller, Mitwitz (DE); Thomas Haagen, Obersiemau (DE); Matthias Fischer, Kronach (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 134 days.

(21) Appl. No.: 10/521,114

(22) PCT Filed: Sep. 16, 2003

(86) PCT No.: PCT/DE03/03142

§ 371 (c)(1),
(2), (4) Date: Jan. 12, 2005

(87) PCT Pub. No.: WO2004/030978

PCT Pub. Date: Apr. 15, 2004

(65) Prior Publication Data

US 2005/0264075 A1    Dec. 1, 2005

(30) Foreign Application Priority Data

Sep. 27, 2002 (DE) ............... 102 46 473
Sep. 27, 2002 (DE) ............. 202 15 321 U

(51) Int. Cl.
*B60N 2/36* (2006.01)
*B60N 2/30* (2006.01)

(52) U.S. Cl. ............... 297/383; 297/331; 297/334; 297/378.1; 297/378.12; 297/378.14

(58) Field of Classification Search ........... 297/383, 297/331, 334, 378.1, 378.12, 378.13, 378.14
See application file for complete search history.

(56) References Cited

U.S. PATENT DOCUMENTS

| 4,368,916 A | * | 1/1983 | Blasin .......... 297/383 X |
| 4,726,622 A | | 2/1988 | Palvölgyi |
| 5,979,985 A | | 11/1999 | Bauer et al. |
| 5,997,090 A | | 12/1999 | Baloche et al. |
| 6,109,692 A | * | 8/2000 | Haland et al. ....... 297/383 X |

(Continued)

FOREIGN PATENT DOCUMENTS

DE    32 19 311 C2    12/1982

(Continued)

OTHER PUBLICATIONS

International Search Report of PCT/DE2003/003142, dated Mar. 11, 2004.

(Continued)

*Primary Examiner*—Rodney B. White
(74) *Attorney, Agent, or Firm*—Christie, Parker & Hale, LLP

(57) ABSTRACT

The invention relates to a seat arrangement for a motor vehicle seat, comprising a seat base that defines a seat surface for a vehicle passenger and extends in the longitudinal direction of the seat, and a back rest. According to the invention, the back rest can be adjusted in relation to the seat base in the longitudinal direction of the seat by means of a lever arrangement.

36 Claims, 11 Drawing Sheets

U.S. PATENT DOCUMENTS

| | | | |
|---|---|---|---|
| 6,152,533 A | 11/2000 | Smuk | |
| 6,533,341 B2 * | 3/2003 | Marinelli | 297/383 X |
| 6,695,378 B2 * | 2/2004 | Hanagan | 297/383 X |
| 2001/0030456 A1 | 10/2001 | Biletskiy | |
| 2004/0051361 A1 | 3/2004 | Rausch et al. | |

FOREIGN PATENT DOCUMENTS

| | | | |
|---|---|---|---|
| DE | 196 46 470 A1 | 5/1998 | |
| DE | 101 09 822 A1 | 9/2001 | |
| DE | 100 47 743 A1 | 4/2002 | |
| DE | 100 57 724 A1 | 5/2002 | |
| EP | 205409 A1 * | 12/1986 | 297/383 |
| EP | 0 404 628 A1 | 12/1990 | |
| FR | 2 781 435 | 1/2000 | |
| GB | 2095984 A * | 10/1982 | 297/383 |
| GB | 2 099 691 A | 12/1982 | |
| GB | 2 374 001 A | 10/2002 | |
| JP | 06227299 A * | 8/1994 | 297/383 |

OTHER PUBLICATIONS

International Preliminary Examination Report of PCT/DE2003/003142, dated Aug. 20, 2004.

English translation of International Preliminary Examination Report dated Aug. 20, 2004 for PCT/DE2003/003142.

* cited by examiner

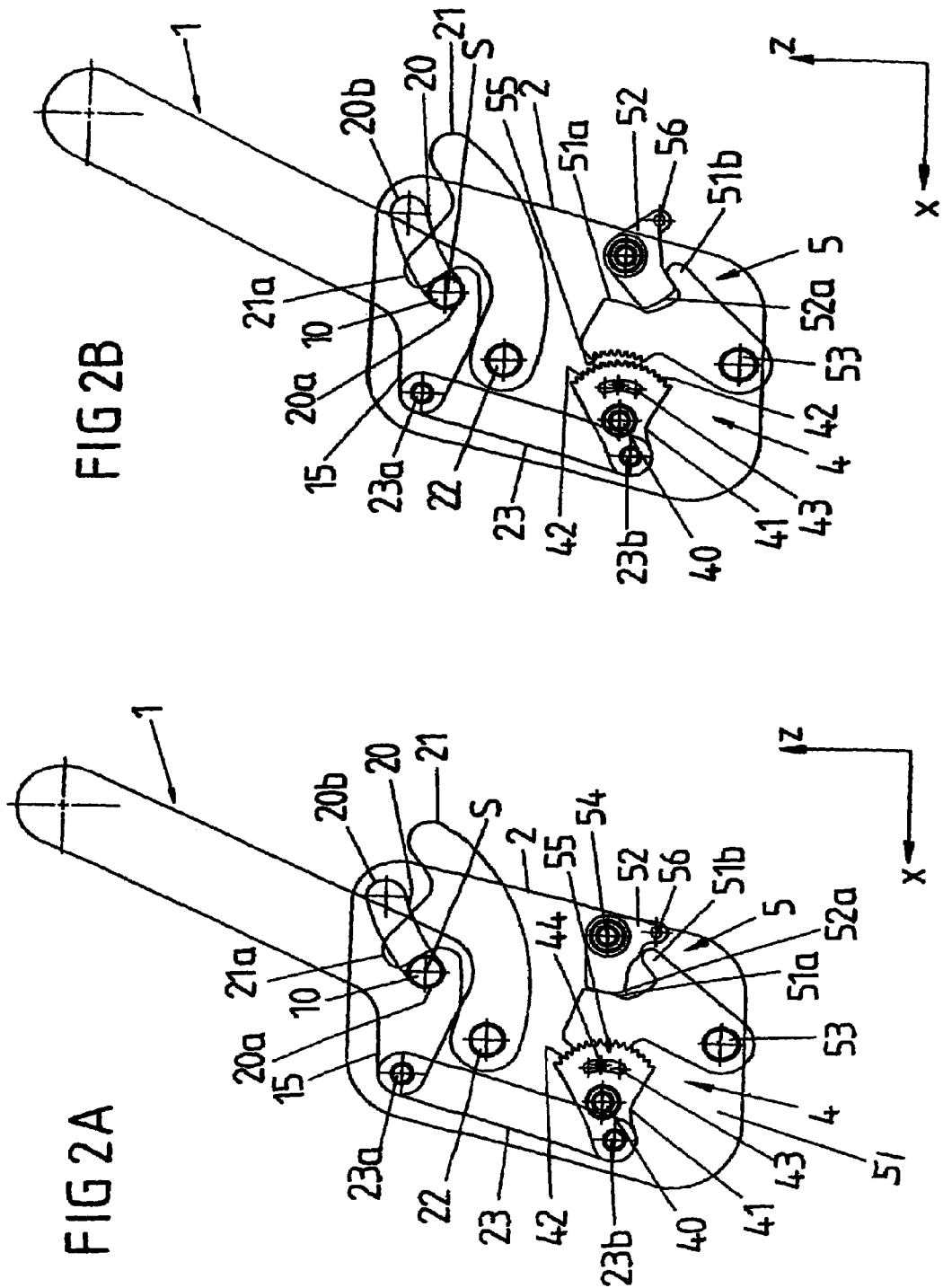

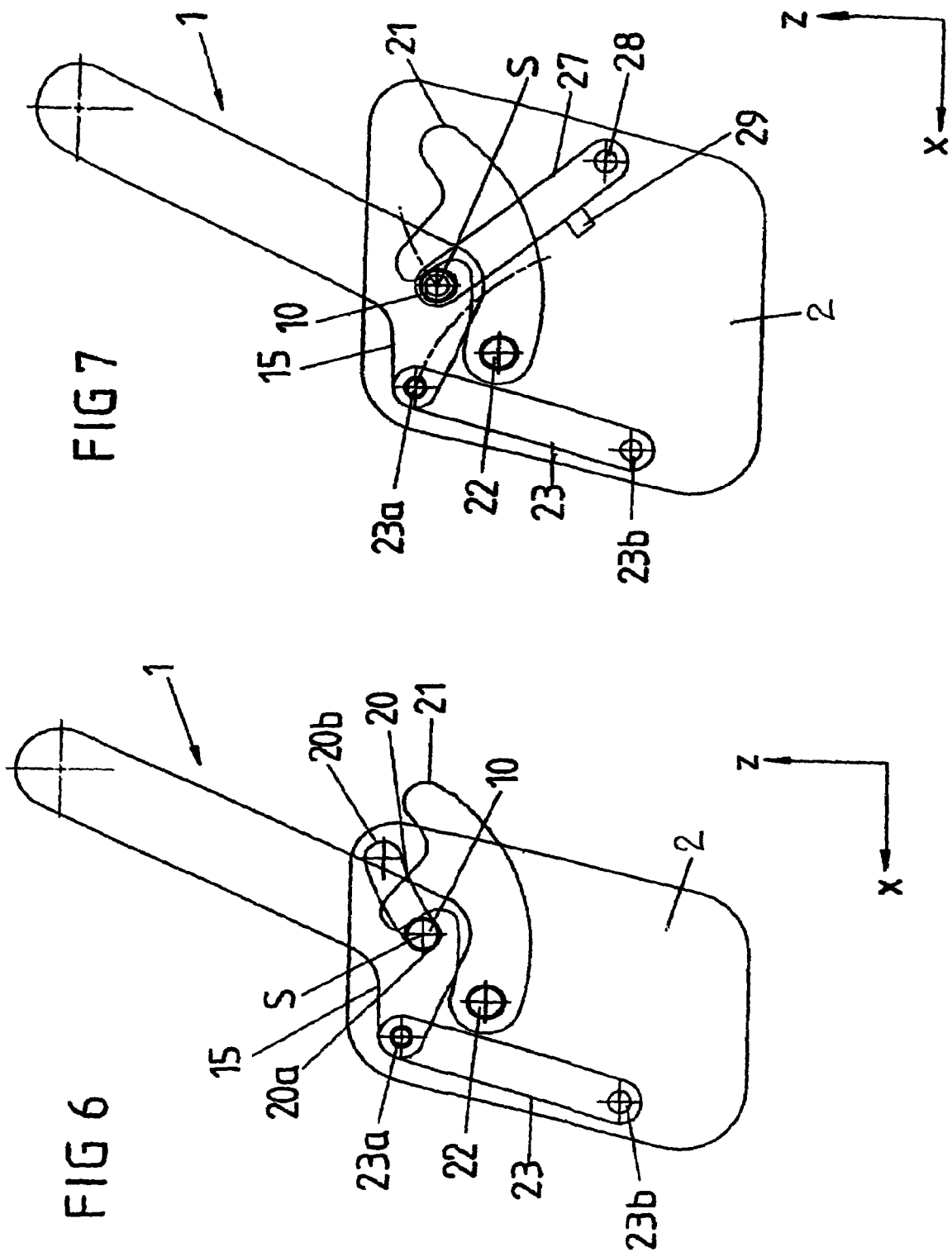

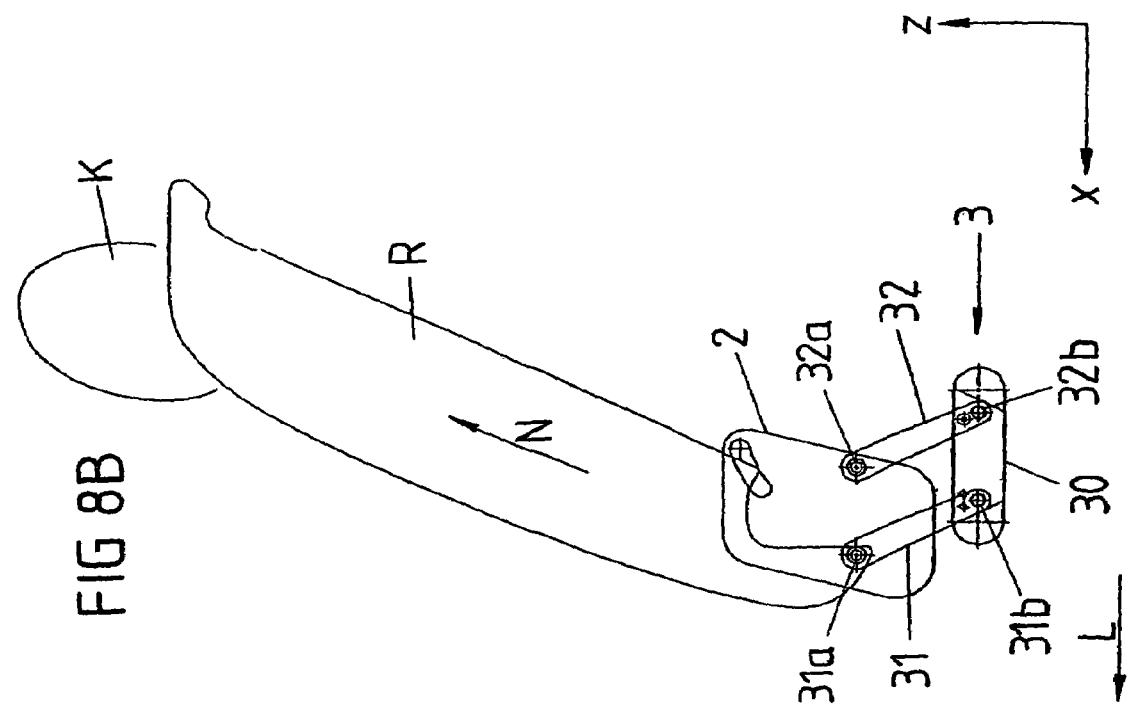
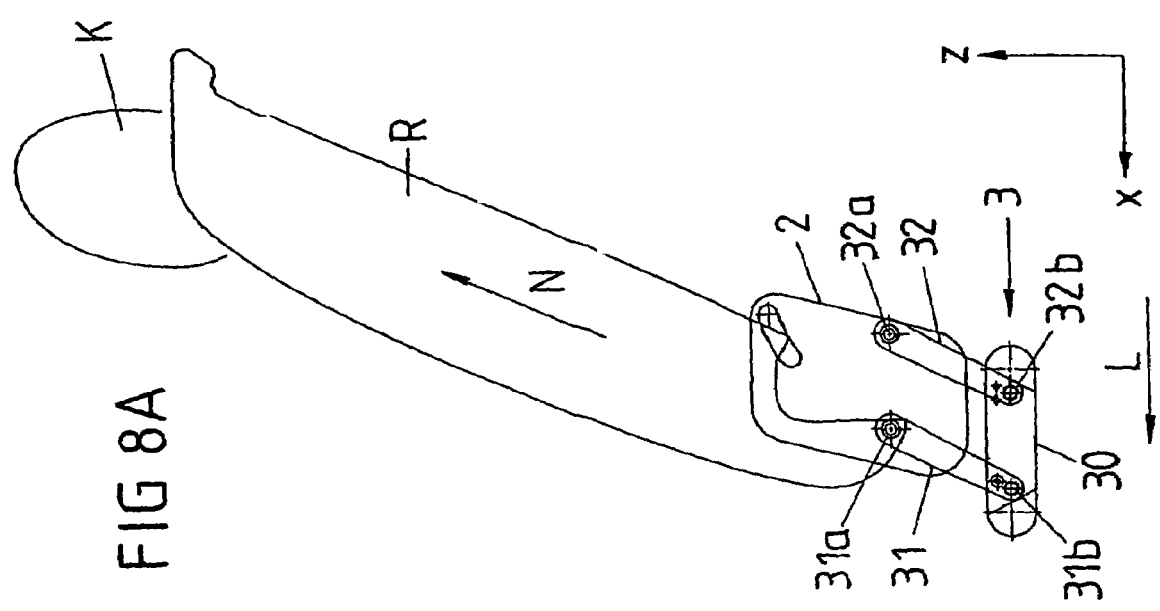

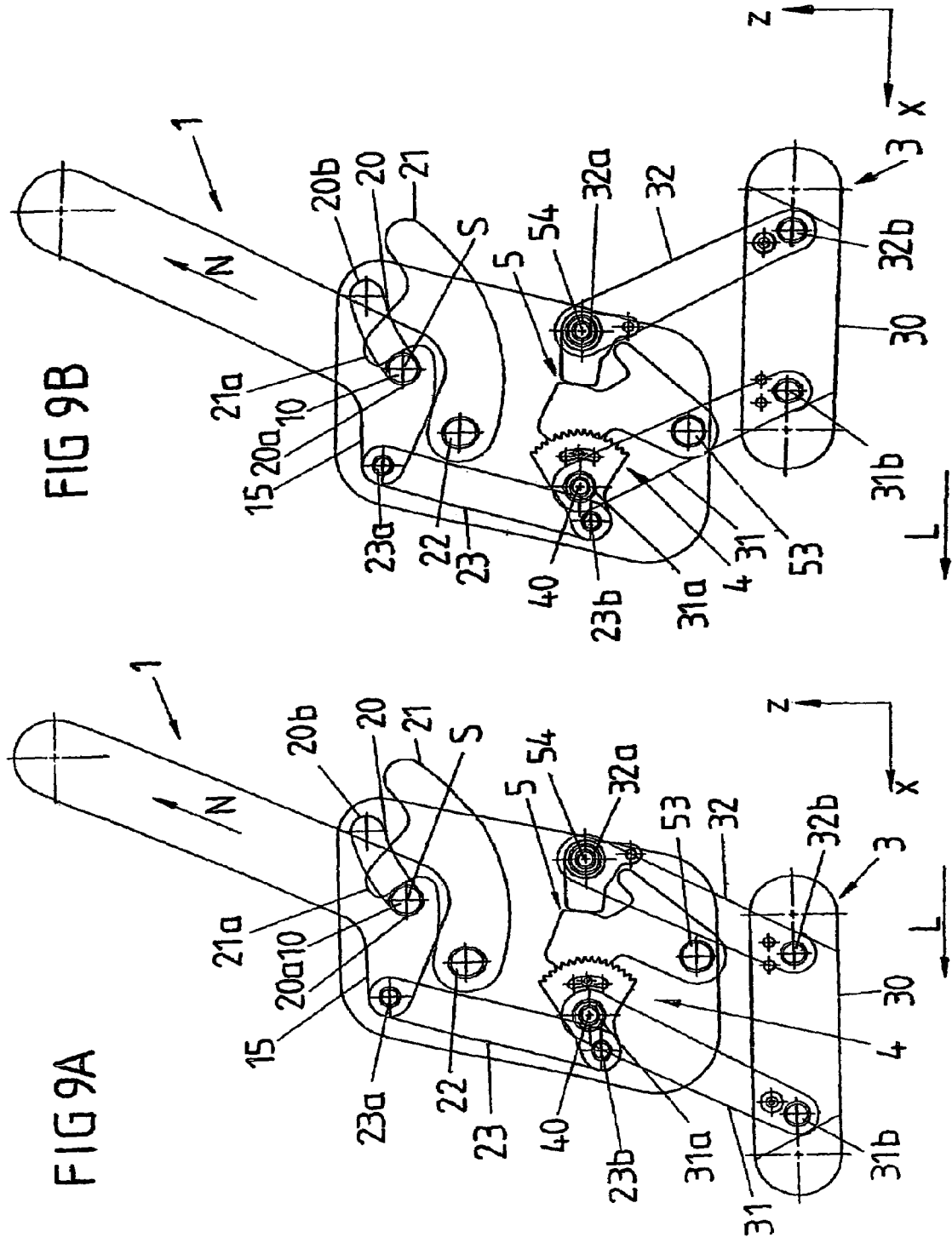

SEAT ARRANGEMENT FOR A MOTOR VEHICLE SEAT

CROSS-REFERENCE TO RELATED APPLICATION

This application is a National Phase Patent Application of International Application Number PCT/DE2003/003142, filed on Sep. 16, 2003, which claims priority of German Patent Application Number 202 15 321.5, filed on Sep. 27, 2002, and 102 46 473.1, filed on Sep. 27, 2002.

BACKGROUND

A seat arrangement with a seat base which defines a seat surface for a vehicle passenger and extends in the longitudinal direction of the seat, as well as a backrest mounted on a frame assembly.

BRIEF DESCRIPTION

An object of the invention is to improve a seat arrangement of this kind with regard to the comfort thereof.

The backrest can be adjusted relative to the seat base in the longitudinal direction of the seat by means of a lever arrangement.

It is hereby possible to adapt the depth of the seat cushion to the individual requirements of a vehicle passenger and to provide additional stowage space behind the corresponding vehicle seat by moving the backrest forwards.

By seat longitudinal direction, along which the seat base extends, is thereby meant that direction along which extend the thighs of a person who is seated on the corresponding vehicle seat. In relation to the state of the seat installed in a motor vehicle this corresponds to the longitudinal direction of the vehicle (drive direction).

The backrest can thereby be brought by the lever arrangement into at least two, and more particularly just two, different longitudinal positions and can be fixed in each of these longitudinal positions by a lock associated with the lever arrangement.

The longitudinal adjustability of the backrest can additionally be obtained through a longitudinal guide, e.g. in the form of a guide slide, in which the lever arrangement, more particularly a pair of articulated levers in the form of a parallelogram assembly, is guided.

The device for adjusting the backrest in the longitudinal direction of the seat can engage on a frame assembly group to which the backrest is attached for swivel movement, more particularly for folding forward and/or for adjusting the incline. The longitudinal displacement of the backrest can be combined with the possibility of adjusting the incline or the possibility of folding the backrest forward.

According to another aspect of the invention, with the seat arrangement having a seat base which defines a seat surface for a vehicle occupant, a backrest is provided which is swivel mounted on a frame assembly group of the seat and which can be folded about a pivotal axis onto the seat surface.

A seat arrangement of this kind can serve both to form a front seat and to form a rear seat of a motor vehicle. It enables the backrest of the corresponding vehicle seat to be folded forwards onto the seat surface in order to provide additional stowage space. The corresponding seat surface is as a rule formed by a seat cushion which is mounted on the seat base. Thus the seat base defines the seat surface insofar as it determines the position of the seat cushion. The seat surface, however, is not formed by the seat base itself but rather by the seat cushion.

With a seat arrangement of the type mentioned earlier the problem exists where the backrest when folding forward may collide, more particularly through a head restraint provided on the backrest, with the windscreen (in the case of a front seat) or with the backrest of another seat (in the case of a rear seat). Therefore it is necessary before folding the backrest onto the seat surface to remove the head restraint from the backrest and place it somewhere else. This considerably affects the operating comfort of a seat arrangement having forward-folding backrests.

In order to improve the operating comfort therefore it is proposed that when the backrest is folded forwards onto the seat surface the pivotal axis of the backrest is moved (displaced) along a predetermined path so that it changes its spatial position.

This path can be selected so that any collision between the backrest of the corresponding vehicle seat and other vehicle components is avoided, particularly in that the path is selected so that when the backrest is folded forwards the upper edge of the backrest (and thus also a head restraint mounted on the upper edge of the backrest) is moved along a curve which rules out any collision with other vehicle components.

The pivotal axis of the backrest can hereby be formed by a physical structural assembly, i.e. it is not a merely virtual pivotal axis, but rather a bearing axis through which the backrest is mounted for pivotal movement on a structural frame assembly unit of the vehicle seat.

When the backrest is folded forwards, this pivotal axis is automatically guided along the predetermined path by a guide device, e.g. in the form of a guide slide so that the desired movement of the upper edge of the backrest is achieved.

As an alternative to a guide device which extends along the predetermined path for the movement of the pivotal axis it is also possible to provide for guiding the pivotal axis a longitudinally extended guide element through which the pivotal axis is connected to the relevant structural frame group and which, as the backrest is folded forwards, is moved so that the pivotal axis moves on the predetermined path curve. A guide lever which is attached for swivel movement on the frame assembly is particularly suitable as a guide element here.

In order to ensure a defined movement of the pivotal axis as the backrest is folded forwards the backrest can additionally be connected to the frame assembly in a section spaced from its pivotal axis (bearing axis), e.g. through a coupling element in the form of a coupling lever which extends from the backrest to the frame assembly. Alternatively, the additional coupling between the backrest and frame assembly group can be provided through a guide device in the form of a guide slide in which a section of the backrest spaced from the pivotal axis is guided as the backrest is folded forwards.

According to one variation of the invention, the pivotal axis is moved on a closed path when the backrest is folded forwards so that after the backrest has been fully folded forwards the pivotal axis is again located at the same spot as before the start of the folding action. This can also be achieved in that when folding the backrest forwards the pivotal axis is moved from one end to the other end of an open path curve and back again to the one end of this path curve.

According to a further development of the invention a device is provided for locking the pivotal axis in the position which corresponds to a backrest raised up in the useful position, and/or in the position which the backrest occupies after being folded forward down onto the seat surface. Accordingly, the pivotal axis can be locked in both end positions of the backrest, thus both in the useful position existing prior to folding the backrest forwards onto the seat surface and also in the position existing after the backrest has been folded forwards onto the seat surface. By backrest raised up into the useful position is thereby meant a position of the backrest in which the latter is suitable for supporting the back of a person sitting on the corresponding vehicle seat and thus not folded forwards onto the seat surface to provide transport space.

A pivotally mounted locking lever is particularly suitable for use as the locking device.

According to a further embodiment of the invention an adjusting device is additionally provided so that the incline of the raised-up backrest can be adjusted between different useful positions. This adjusting device thus does not serve to fold the backrest forwards onto the seat surface, but rather provides for adjusting the rake angle of the raised-up backrest so that it may be adapted to the individual needs of the vehicle occupant. The backrest thereby remains, however, always in a position in which it is suitable for supporting the back of a person seated on the corresponding vehicle seat.

Adjusting the incline of the backrest can be carried out depending on the design of adjusting device provided for this purpose through manual action directly on the backrest itself or by a drive, possibly an electric drive, coupled to the backrest.

In order to fix a previously set incline of the backrest it is possible to provide a locking device which can be formed by a self-locking design of the adjusting device which is provided for adjusting the backrest incline or a brake interacting herewith, or through a separate lock, particularly if the adjustment of the backrest incline is to be through direct manual action on the backrest. A separate lock of this kind can comprise a primary locking element which in order to fix the backrest acts on same, as well as a secondary locking element which blocks the primary locking element in a position in which it causes the backrest to be fixed. The secondary locking element can furthermore serve to bring the primary locking element out of engagement with the backrest when the setting of the backrest incline is to be changed.

BRIEF DESCRIPTION OF THE DRAWINGS

Further features and advantages of the invention will now become apparent from the following description of an embodiment with reference to the drawings.

FIGS. 2a, 2b show details of a device for adjusting the incline of the backrest of FIG. 1;

FIG. 6 shows an arrangement with a device for folding forwards a backrest which does not have an adjustable incline;

FIG. 7 shows a further modification of the device illustrated in FIGS. 3a and 3b for folding the backrest forwards;

FIGS. 8a, 8b show a device for moving a backrest of a motor vehicle seat in the longitudinal direction of the seat;

FIGS. 9a, 9b show a combination of a device for adjusting the incline of a backrest of a motor vehicle seat with a device for folding the backrest forwards onto the seat surface as well as a device for moving the backrest in the longitudinal direction of the seat;

In all the figures the individual components of a seat arrangement are all shown as transparent.

DETAILED DESCRIPTION

Figure 1:
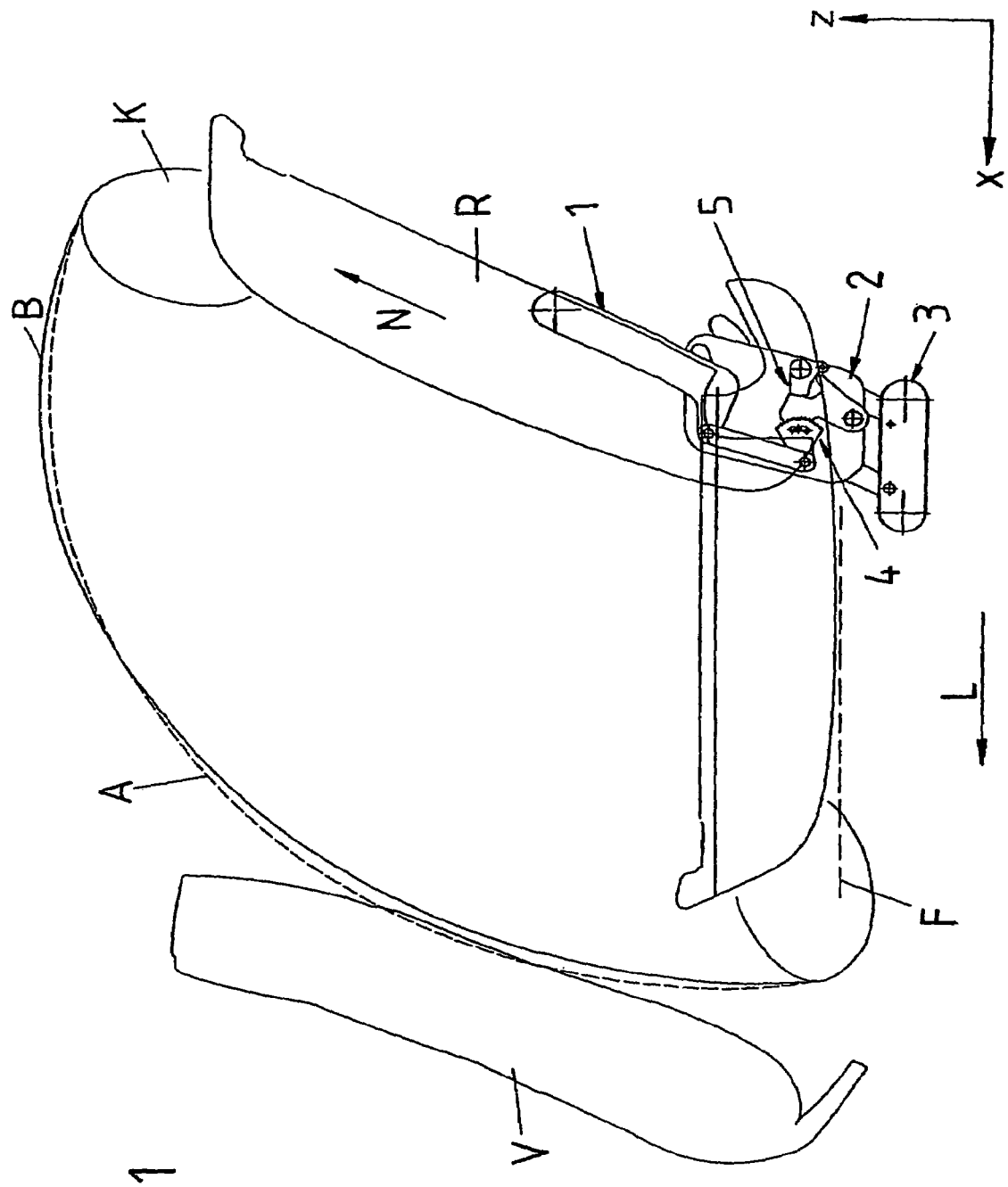
FIG. 1 shows a diagrammatic view of a motor vehicle seat having an incline-adjustable backrest which furthermore can be folded forwards onto the seat surface of the vehicle seat.

FIG. 1 shows a backrest R of a motor vehicle seat with head restraint K on one side in an upright useful position and on the other side in a substantially horizontal position folded forwards onto a seat surface F. The seat surface F is formed by a seat cushion on a seat base.

The backrest R can be adjusted in incline N between different useful positions. These useful positions are each suitable in the relevant useful position for supporting the back of a person seated on the corresponding vehicle seat. In relation to the state of a vehicle seat installed in a motor vehicle, the useful region normally extends from the perpendicular alignment of the backrest R (along the vertical vehicle axis z) up to a steep rearwardly inclined backrest R.

Furthermore, the backrest R can be folded forwards towards the seat surface F which is formed by the seat cushion mounted on the seat base in order to provide additional transport space inside the vehicle. This is particularly important in the case of a rear seat, as shown in FIG. 1.

When folding the backrest R of a rear seat forwards there is the problem that the top side of the backrest or the head restraint K mounted thereon may collide with the backrest of a front seat V. This is clearly illustrated through the curve A shown in dotted lines in FIG. 1 which indicates the movement of the top side of the head restraint K on swivelling back backrest R about a defined axis in the lower region of the backrest. It can be seen that this curve A intersects the backrest of the front seat V. This means that the backrest R of the rear seat can only then be folded down onto the seat surface F if the head restraint K has previously been removed. This reduces the operating comfort of the device for folding down the backrest R.

In order to overcome this drawback the device for folding down the backrest R on to the seat surface F is now designed so that the pivotal axis about which the backrest R is pivoted as it is folded forwards onto the seat surface F is moved as the backrest is folded forwards so that there can be no collision between the upper edge of the head restraint K and the front seat V.

A corresponding path curve B for the upper edge of the head restraint K is shown in FIG. 1 by a solid line. It can be seen that on folding the backrest forwards the pivotal axis is first moved upwards (along the vertical vehicle axis z) and backwards (opposite the longitudinal axis x of the vehicle). The corrected path curve B is hereby shifted relative to the original path curve A (which arises when folding back the backrest about a pivotal axis which has not moved) slightly upwards (along the vertical vehicle axis z) and slightly backwards (opposite the vehicle longitudinal direction x). This prevents the upper edge of the head restraint K from colliding with the backrest of the front seat V.

Furthermore, the backrest R of the vehicle seat illustrated in FIG. 1 can be displaced in the seat longitudinal direction L relative to the seat base and the seat surface F. The seat longitudinal direction L is thereby defined as that direction along which extend the seat base and the seat cushion mounted thereon forming the seat surface F. With a vehicle seat installed in a motor vehicle the seat longitudinal direction L corresponds to the vehicle longitudinal axis x. I.e., the seat longitudinal direction L corresponds to that direction along which a vehicle seat can usually be displaced by means of a seat longitudinal adjuster.

Sliding the backrest R in the seat longitudinal direction L (or vehicle longitudinal direction x) relative to the seat base and the seat surface F can serve many different purposes. On the one hand, the depth of the seat cushion can be adjusted in order to adapt this to the individual requirements of a vehicle occupant. On the other hand, by sliding the backrest R forwards in the seat longitudinal direction L additional stowage space can be gained behind the backrest R. Conversely, sliding the backrest R backwards helps to ensure that the backrest R does not collide with the front seat V as it is folded forwards.

The structural units 1, 2, 3, 4, 5 of the vehicle seat illustrated in FIG. 1 which enable the rake of the backrest to be adjusted, the backrest to be folded down onto the seat surface as well as the backrest to move in the longitudinal direction of the seat will now be explained in further detail with reference to FIG. 2a to 9b.

FIG. 2a shows a backrest fitment 1 on which the backrest R of a motor vehicle seat illustrated in FIG. 1 can be fixed and which has in the region of its lower end along the vertical vehicle axis z a bearing pivot 10 through which it is mounted for swivel movement on a frame assembly unit 2 in the form of a support plate of the seat frame. The bearing pivot 10 of the backrest fitment 1 is mounted for pivotal movement in a guide slide 20 of the support plate 2 so that the bearing pivot 10 and thus the pivotal axis S of the backrest fitment 1 can be moved through displacement along the guide slide 20 between a first end 20a and a second end 20b of the guide slide.

In the situation illustrated in FIG. 2a such movement of the bearing pivot 10 along the guide slide 20 is prevented through a locking nose 21a of a locking lever 21 which is mounted to pivot around a bearing point 22 of the support plate 2 and which engages over the bearing pivot 10 thereby blocking its movement along the guide slide 20.

The backrest fitment 1 furthermore has a projection 15 through which the backrest fitment 1 is coupled spaced from the bearing pivot 10 by means of a coupling lever 23 to an adjusting lever 41 of a device 4 for adjusting the rake of the backrest fitment 1. The coupling lever 23 is for this purpose connected for articulated movement at its one upper end 23a to the projection 15 of the backrest fitment 1 and at its other lower end 23b to the adjusting lever 41. The adjusting lever 41 is able to pivot about a bearing point 40 provided on the support plate 2 and has external teeth 42 which engage with a locking device 5 so that a pivotal movement of the adjusting lever 41 is not possible in the situation illustrated in FIG. 2.

The adjusting lever 41 has furthermore a slide 43 in which a pivot 44 engages which is provided on the support plate 2, thus thereby serving to restrict the possible pivotal range of the adjusting lever 41.

The locking device 5 associated with the adjusting lever 41 comprises a primary locking element 51 which can swivel as a locking lever about a bearing point 53 provided on the support plate 2 and which has a toothed region 55 which engages in the toothed region 42 of the adjusting lever 41 in order to lock the latter. Associated with the primary locking element 51 is also a secondary locking element 52, likewise designed as a locking lever and able to pivot about a further bearing point 54 and which bears with a stop 52a against an associated stop 51a of the primary locking element 51 and thereby prevents pivotal movement of the primary locking element 51 which would release the teeth of the adjusting lever 41.

A force engagement point 56 is provided on the second locking element 52 where force can be introduced which leads to pivotal movement of the secondary locking element 52 so that the associated stops 51a, 52a of the two locking elements 51, 52 move out of engagement. Any physical or technical principles can be used to trigger the corresponding swivel movement of the second locking element 52, for example an actuator in the form of an electromagnet or an electric motor or alternatively a manual actuating device etc.

The primary locking element 51 is preferably pretensioned by means of an elastic element (not shown in FIG. 2a) so that after pivoting the primary locking element it is automatically turned about its pivotal axis 53 so that it releases the teeth of the adjusting lever 41, see FIG. 2b. Alternatively when pivoting the secondary locking element 52 this can act on a projection 51b of the primary locking element 51 and thereby actuate a pivotal movement of the primary locking element 51 through which its teeth 55 move out of engagement with the associated teeth 42 of the adjusting lever 41.

In the position illustrated in FIG. 2b, it is now possible to change the rake of the backrest fitment 1 and thus of the backrest R itself by manually exerting a force directly on the backrest itself. The rake of the backrest fitment 1 is hereby reset once more as a result of the pivotal movement about the pivotal axis S which is defined by the bearing pivot 10. The pivotal axis S is hereby not moved since the bearing pivot 10 is fixed at the first end 20a of the guide slide 20 by means of the locking nose 21a of the locking lever 21. Setting the rake of the backrest R is thus carried out by a pivotal movement about the locally fixed axis S.

At the conclusion of the adjusting movement the actual rake setting of the backrest fitment 1 is fixed by means of the locking device 5 in that the secondary locking element 52 is pivoted again into the position in which it acts on the primary locking element 51 so that this locks the adjusting lever 41 which is coupled to the backrest fitment 1 through the coupling lever 23.

Figure 3B:
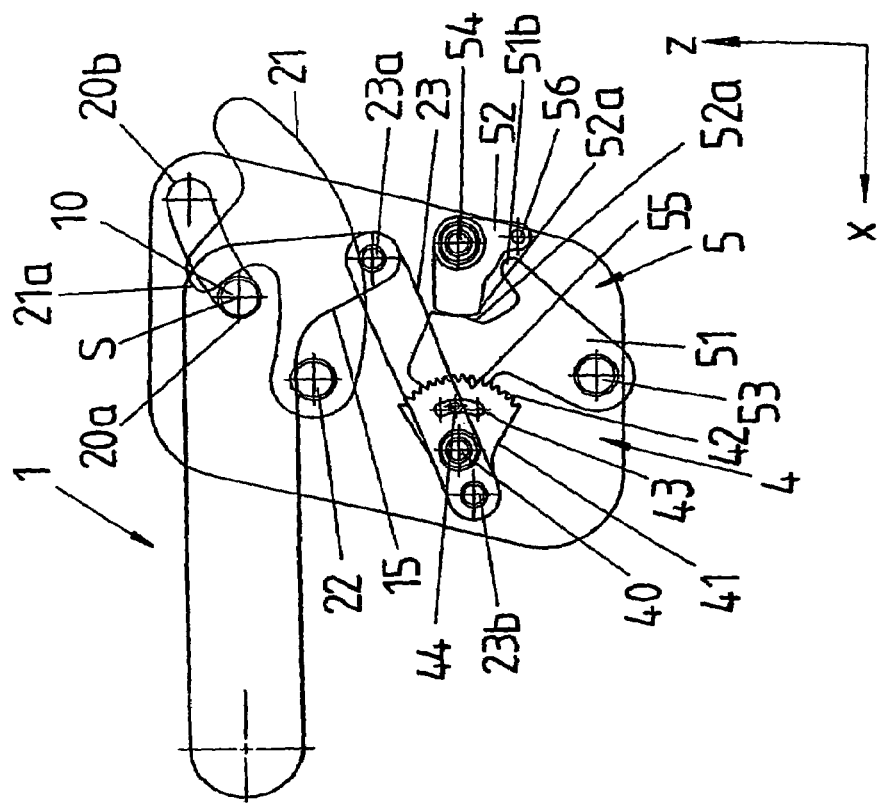
FIGS. 3a, 3b show details of a device for folding the backrest of FIG. 1 onto the seat surface.
Figure 3A:
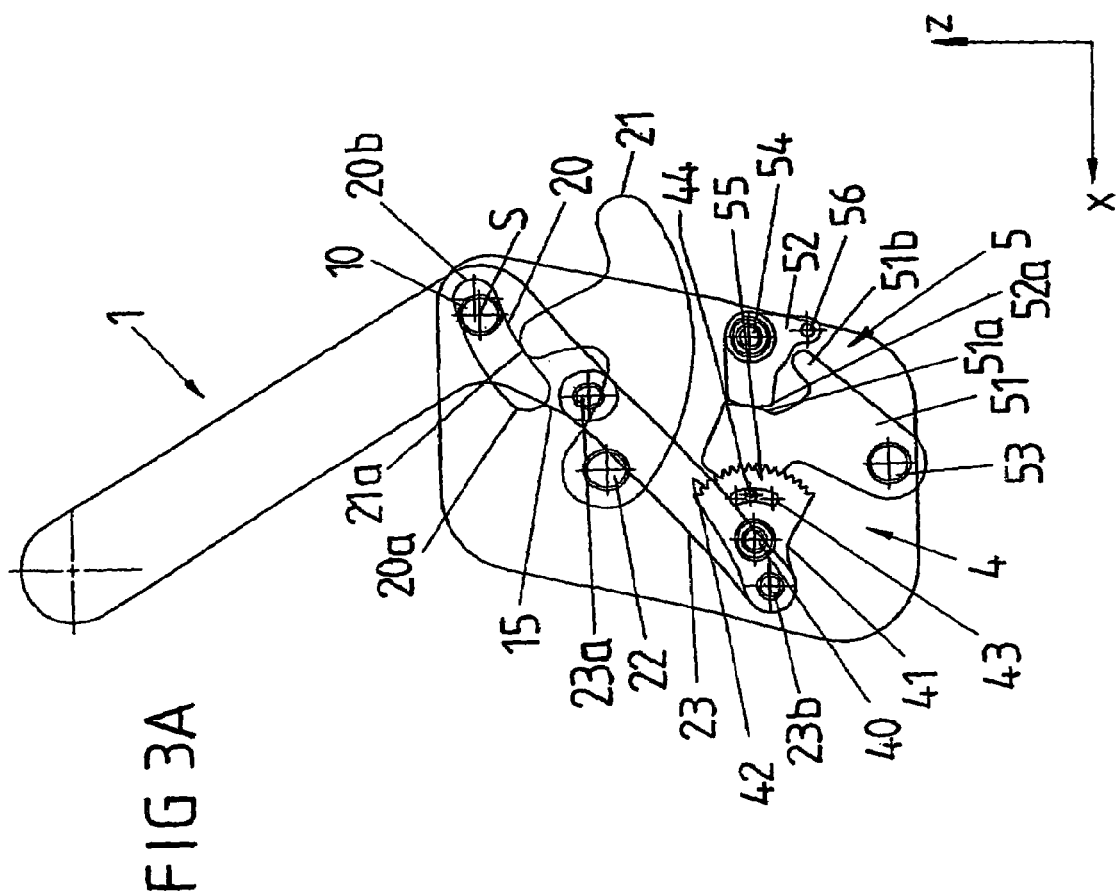

FIGS. 3a and 3b show how it is possible to fold the backrest fitment 1 forwards using the arrangement explained with reference to FIGS. 2a and 2b so that the backrest R is folded down onto the seat surface F, see FIG. 1.

FIG. 3a shows the arrangement in a situation in which the backrest fitment has covered just on half its path as it is folded forwards onto the seat surface, and FIG. 3b shows the backrest fitment 1 when it has been folded completely forwards.

Folding the backrest fitment 1 forwards is possible in that first by swivelling the locking lever 21 about its pivotal axis 22 the locking nose 21a has been brought out of engagement with the bearing pivot 10 forming the pivotal axis S of the backrest fitment 1, see FIG. 3a. The pivotal movement of the locking lever 21 required for this can be triggered manually or by remote control (e.g. electrically) by a suitable actuator.

After unlocking the bearing pivot 10 and thus the pivotal axis S the backrest R (see FIG. 1) can now be folded forwards together with the backrest fitment 1 down towards the seat surface F of the vehicle seat by a person seizing the backrest R and moving it towards the seat surface F. During this folding movement of the backrest R and the backrest fitment 1 the bearing pivot 10 which defines the relevant momentary pivotal axis S of the backrest fitment 1 during forward folding movement is moved in the guide slide 20 between the first stop 20*a* and the second stop 20*b*.

The movement of the bearing pivot 10 in the guide slide 20 is controlled through the coupling lever 23 through which the backrest fitment 1 is coupled to the adjusting lever 41 outside of its pivotal axis S. Since the adjusting lever 41 is locked by the associated locking device 5 as the backrest and backrest fitment 1 are folded forwards, the backrest fitment 1 is coupled as it is folded forwards through the coupling lever 23 to an element which is fixed on the frame and is not movable relative to the support plate 2.

Through the action of the coupling lever 23 on the backrest fitment 1 the bearing pivot 10 of the backrest fitment 1 is moved as the backrest fitment folds forwards from the first end 20*a* to the second end 20*b* of the guide slide 20 and then back again to the first end 20*a*. When the backrest fitment 1 is fully folded forwards the bearing pivot 10 and the pivotal axis S are thus again located at the same point as at the beginning of the folding movement. This is clearly apparent from FIG. 1 according to which the two curves A (corresponding to folding the backrest R forwards with a locally fixed pivotal axis) and B (corresponding to folding the backrest R forwards with a spatially variable pivotal axis) each coincide at the beginning of the folding movement (with the backrest in the upright position) and at the end of the folding movement (with the backrest folded fully forward).

The transition from the path curve A shown in dotted lines in FIG. 1 (folding movement with a spatially fixed pivotal axis) to the path curve B shown in solid line (with a spatially variable pivotal axis) in which the second-mentioned path curve B is off-set relative to the first mentioned path curve A upwards (along the vertical vehicle axis z) and backwards (opposite the vehicle longitudinal axis x) is achieved in that the guide slide in the support plate 2 extends inclined upwards and backwards from its first end 20*a* to its second end 20*b*, thus has a component along the vertical vehicle axis z and against the vehicle longitudinal axis x. Outside of the two end points of the folding movement the bearing pivot 10 and the pivotal axis S are thus always above and behind the position which they have occupied at the start of the folding movement. That position is in turn defined in that the bearing pivot 10 prior to the start of the folding movement bears against the first end 20*a* of the guide slide 20.

In particular as the backrest R is folded forwards the pivotal axis S is moved at least during the first part of the folding movement along a direction (with a component backwards opposite the vehicle longitudinal axis x and a component upwards along the vertical vehicle axis z) which is substantially opposite the direction of the folding movement (with a component forwards along the vehicle longitudinal axis x and a component backwards opposite the vertical vehicle axis z).

Starting from the first end 20*a* of the guide slide 20 the further movement of the bearing pivot 10 in the guide slide 20 is controlled between the two ends 20*a*, 20*b* through the coupling lever 23. The guide slide 20 thus fixes the path along which the bearing pivot 10 and the pivotal axis S can be moved as the backrest fitment 1 is folded forwards and the coupling lever 23 determines the movement along this path.

By changing the geometry of the guide slide 20 as well as by varying the arrangement of the coupling lever 23 it is thus possible to produce any other path along which the pivotal axis S of the backrest fitment 1 can be moved as the backrest fitment 1 is folded forwards in order to achieve a defined desired movement of the backrest as it is folded forwards.

Figure 4:
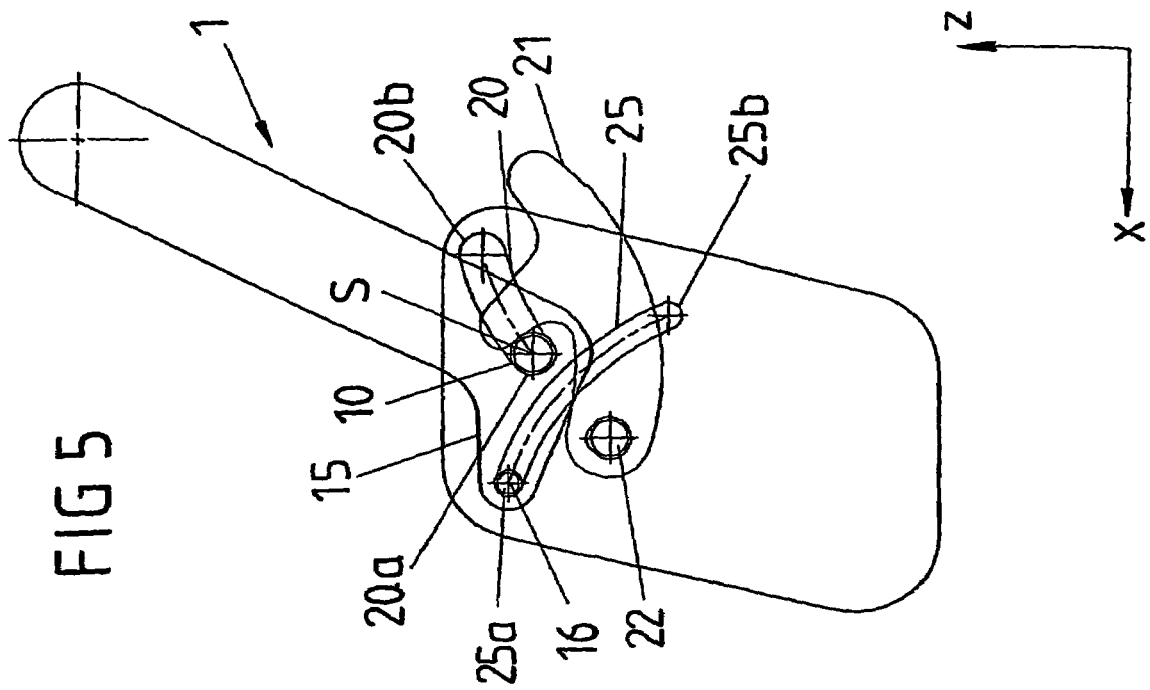
FIG. 4 shows a modification of the device illustrated in FIGS. 2a and 2b for adjusting the incline of the backrest.

FIG. 4 shows a modification of the arrangements of FIGS. 2*a* to 3*b* where the adjusting lever 41 interacts through its teeth 42 with a drive pinion 45 which is rotatable manually or by remote control (more particularly by electric motor) in order to adjust the incline of the backrest fitment. A rotational movement of the drive pinion 45 is converted into a pivotal movement of the adjusting lever 41 about its pivotal axis 40 which is transferred through the coupling lever 23 to the backrest fitment 1 and thus leads to a change in the incline setting of the backrest fitment 1.

Locking the backrest fitment 1 in a specific inclined position can thereby be achieved in that the drive device driving the drive pinion 45 is designed to be self-locking or is coupled to a separate brake device. In each case it must be prevented that the drive pinion 45 moves in the event of torque applied on the output side, thus from the sides of the adjusting lever 41.

Figure 5:
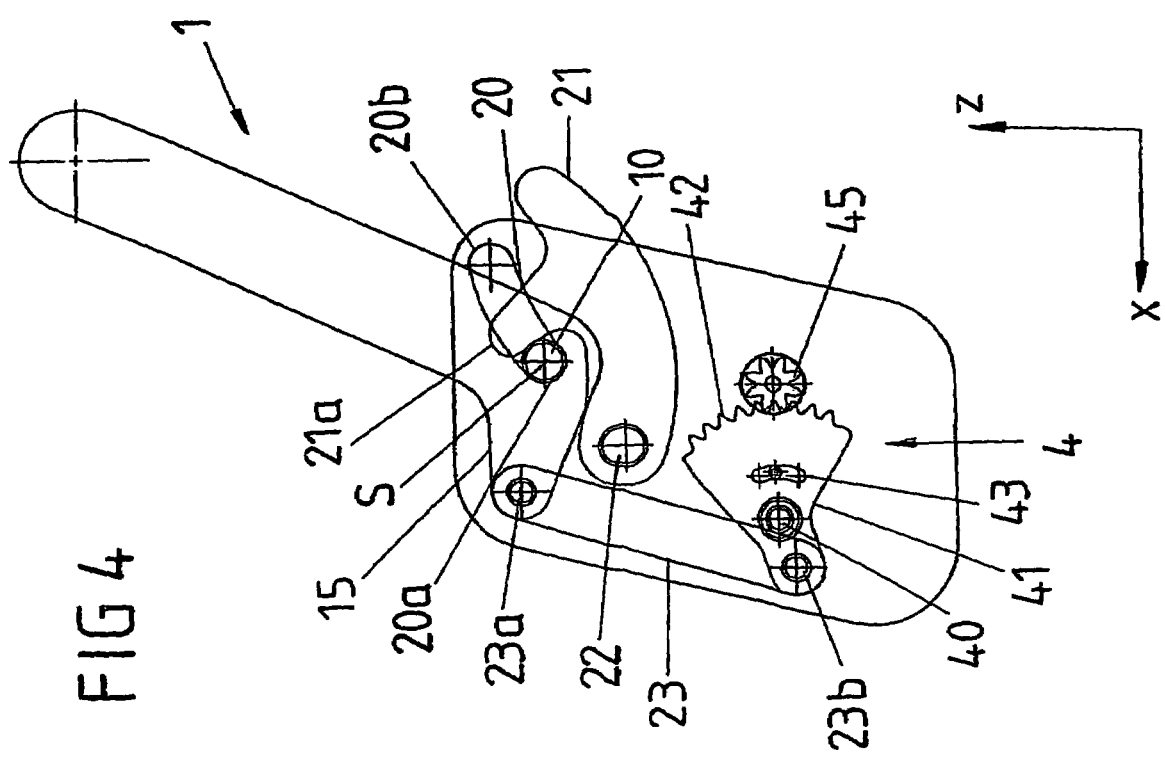
FIG. 5 shows a modification of the device illustrated in FIGS. 3a and 3b for folding the backrest forwards.

FIG. 5 shows a further modification of the arrangement of FIGS. 2*a* to 3*b*. With the arrangement according to FIG. 5 there is no device for adjusting the incline of the backrest fitment 1. The backrest fitment 1 is thus here only able to fold down onto the seat surface but cannot be adjusted in incline between different useful positions. Such an arrangement is suitable in particular for use in rear seats of motor vehicles.

Furthermore the coupling lever 23 of FIGS. 2*a* to 3*b*, through which the backrest fitment 1 is coupled outside of its pivotal axis S to an element fixed on the frame, is here replaced by a control slide 25 in which the projection 15 of the backrest fitment 1 is guided by a guide element 16 provided on the projection 15 between a first end 25*a* and a second end 25*b*. Like the coupling lever 23 of FIGS. 2*a* to 3*b* the control slide 25 of FIG. 5 undertakes the function of controlling the movement of the bearing pivot 10 and the pivotal axis S in the guide slide 20.

FIG. 6 shows a third modification of the arrangement of FIGS. 2*a* to 3*b* whereby the sole difference is that the device for adjusting the backrest rake between the different useful positions has been omitted. Instead, the coupling lever 23 is attached for pivotal movement at its lower end 23*b* directly to the support plate 2.

With the fourth modification of the arrangement of FIGS. 2 to 3*b*, as shown in FIG. 7, the guide slide 20 is replaced by a guide lever 27 which is mounted for pivotal movement on a bearing point 28 of the support plate 2 and which at its free end remote from the bearing point 28 is connected for articulated movement to the bearing pivot 10 of the backrest fitment 1 or holds same in rotatable manner. In this case an additional device (not shown in FIG. 7) has to be provided for locking the guide lever 27 in one or both end positions which correspond to the backrest positioned in a useful position or folded forwards onto the seat surface. A stop 29 is thereby provided on the guide lever 27 to define an end position when the guide lever 27 swivels and hereby undertakes the function of the end stops of a guide slide.

With this embodiment movement of the bearing pivot 10 and the pivotal axis S of the backrest fitment 1 as the latter is folded forwards is achieved in that the guide lever 27 pivots about its axis formed by the bearing point 28. The control of this movement is undertaken as in the embodiment according to FIG. 6 through the coupling lever 23 which is attached directly to the support plate 2.

The arrangement of FIG. 7 thus forms a square articulated joint as a device for folding the backrest forwards onto the seat surface.

FIGS. 8a and 8b show a further aspect of the invention according to which the backrest R of a motor vehicle seat is movable in the seat longitudinal direction L (see FIG. 1) and vehicle longitudinal direction x relative to the seat base and the associated seat surface. This is presently achieved here in that the structural frame unit (support plate 2) on which the backrest R is mounted can be displaced in the longitudinal direction x of the vehicle.

The displacement of the support plate 2 in the longitudinal direction x of the vehicle is hereby possible in that the support plate 2 is connected in the region of its front end in the vehicle longitudinal direction x and in the region of its rear end in the vehicle longitudinal direction x to a floor assembly unit 30 through a displacement lever 31 and 32 respectively. The two displacement levers 31, 32 form a parallelogram assembly as known for adjusting complete seat frames, and are each attached by their upper end 31a and 32a to the support plate 2 and by their lower end 31b and 32b to the floor assembly unit 30. The backrest R can be moved forwards in the longitudinal direction of the vehicle (FIG. 8b) and back again (FIG. 8a) by pivoting the adjustment levers 31, 32 in unison which are hereby always aligned in parallel.

If during adjustment of the backrest R in the vehicle longitudinal direction x the height of the backrest R is to remain constant along the vertical vehicle axis z then the displacement levers 31, 32 must have in their second end position (FIG. 8b) an incline to the vertical vehicle axis z which is oppositely identical to that as in their first end position (FIG. 8a). In this case only two different longitudinal positions of the backrest R can be set by means of the adjusting device 3 formed by the displacement levers 31, 32, as shown in FIGS. 8a and 8b.

If on the other hand during the displacement of the backrest R in the vehicle longitudinal direction x a change in the position of the backrest along the vertical axis is to be taken into account then more than two positions can be set in the vehicle longitudinal direction x. Corresponding locking elements must then be provided, e.g. in the form of ratchet elements which enable the backrest R to be locked in the individual longitudinal positions.

With the embodiment illustrated in FIGS. 8a and 8b an adjustment of the backrest R in the vehicle longitudinal direction x is only provided between the two end positions illustrated in FIGS. 8a and 8b. These end positions are each stable if corresponding restricting means are provided, e.g. in the form of stops, or other locking means which prevent further pivotal movement of the displacement levers 31, 32 beyond the relevant end position or with which the displacement levers 31, 32 can be locked in the relevant end position.

The floor unit 30 can furthermore be guided displaceable in a longitudinal guide in the longitudinal direction x of the vehicle.

FIGS. 9a and 9b show a combination of the adjusting device of FIGS. 8a and 8b with the adjusting devices of FIGS. 2a to 3b. An adjustment of the backrest fitment 1 in the seat longitudinal direction x is hereby possible as well as an adjustment of the incline N of the backrest fitment 1 and furthermore a forward folding of the backrest fitment 1 in the direction of the seat surface of the corresponding vehicle seat.

In this case the two displacement levers 31, 32 are attached by their upper ends 31a, 32a to the bearing point 40 of the adjustment lever 41 and the bearing point 54 of the secondary locking element 52, respectively.

Figure 10:
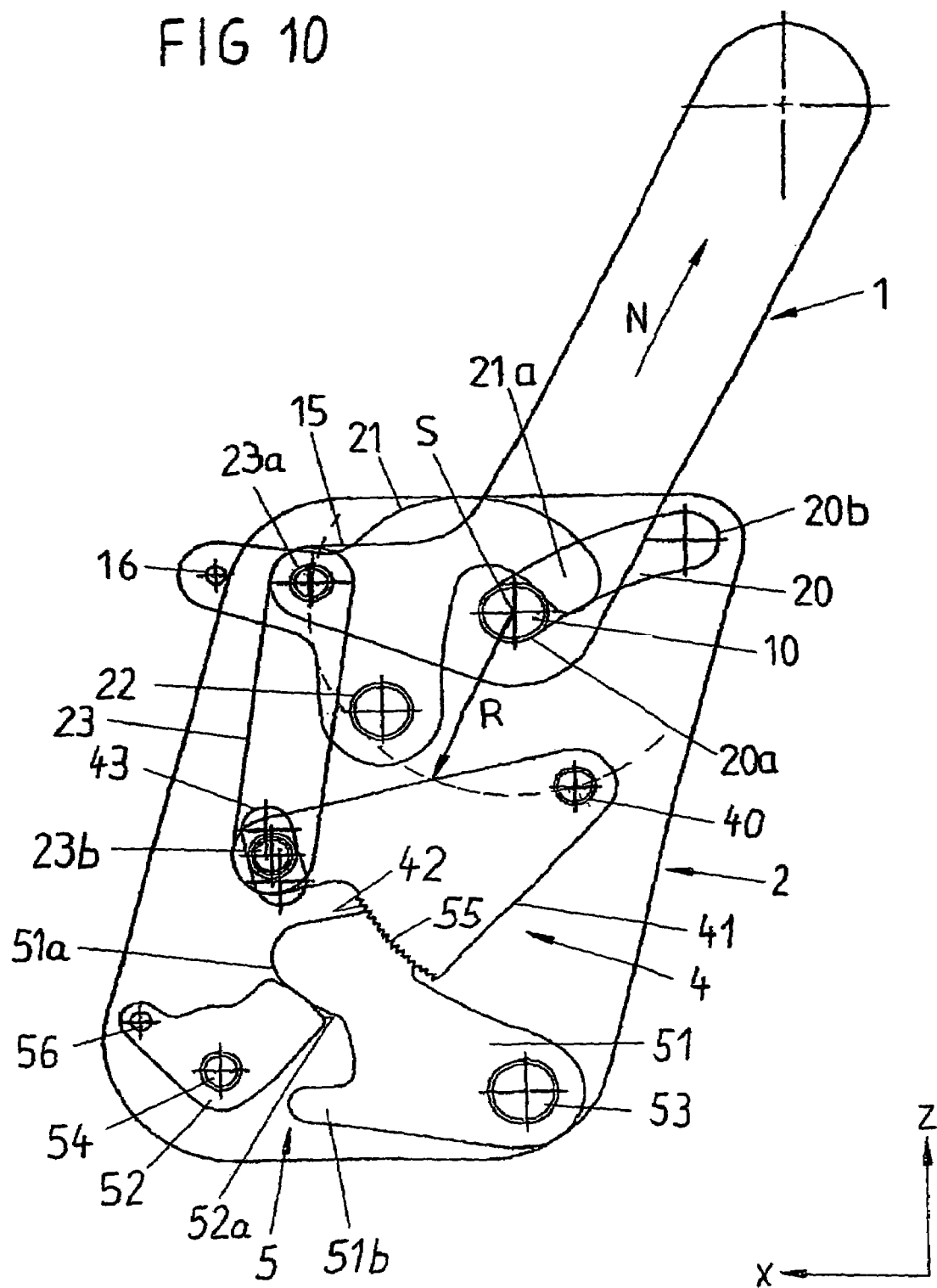
FIG. 10 shows a further embodiment of a device for folding the backrest of a motor vehicle seat onto the seat surface.

The arrangement illustrated in FIG. 10 which has a device 4 for adjusting the incline angle of the backrest in an upright useful position with an associated locking device 5 and a device for folding the backrest forwards onto the seat surface, corresponds substantially to the arrangement illustrated in FIGS. 2a to 3b. Thus, only the essential technical differences will now be highlighted. As far as the remaining constituent parts of the arrangement illustrated in FIG. 10 are concerned reference is made to the corresponding details on FIGS. 2a to 3b where matching structural elements and structural units are given the same reference numerals in FIG. 10 as in FIGS. 2a to 3c.

It should first be noted that with the arrangement illustrated in FIG. 10 two structural elements, namely the backrest fitment 1 and the coupling lever 23 are mounted on a different side of the support plate 2 (namely, on the second side or reverse side) than the other structural groups, namely, the locking lever 21, the adjustment lever 41 and the locking device 5 which are each arranged on a first side (front side) of the support plate 2. The arrangement of the aforementioned structural groups on different sides of the support plate 2 cannot be seen in FIG. 10 since here the individual structural elements and structural units are all shown transparent in the figures. The arrangement of individual structural units on different sides of the support plate 2 is necessary to prevent collision between the units during an adjusting process.

With the arrangement illustrated in FIG. 10 it is important that the axis formed by the connecting point 23a of the coupling lever 23 on the projection 15 of the backrest fitment 1 as well as the axis formed by the bearing point 40 of the adjustment lever 41 lie on a circular path whose center point is formed by the pivotal axis S of the backrest fitment 1 and which has a defined radius R relative to this center point.

Figure 11A:
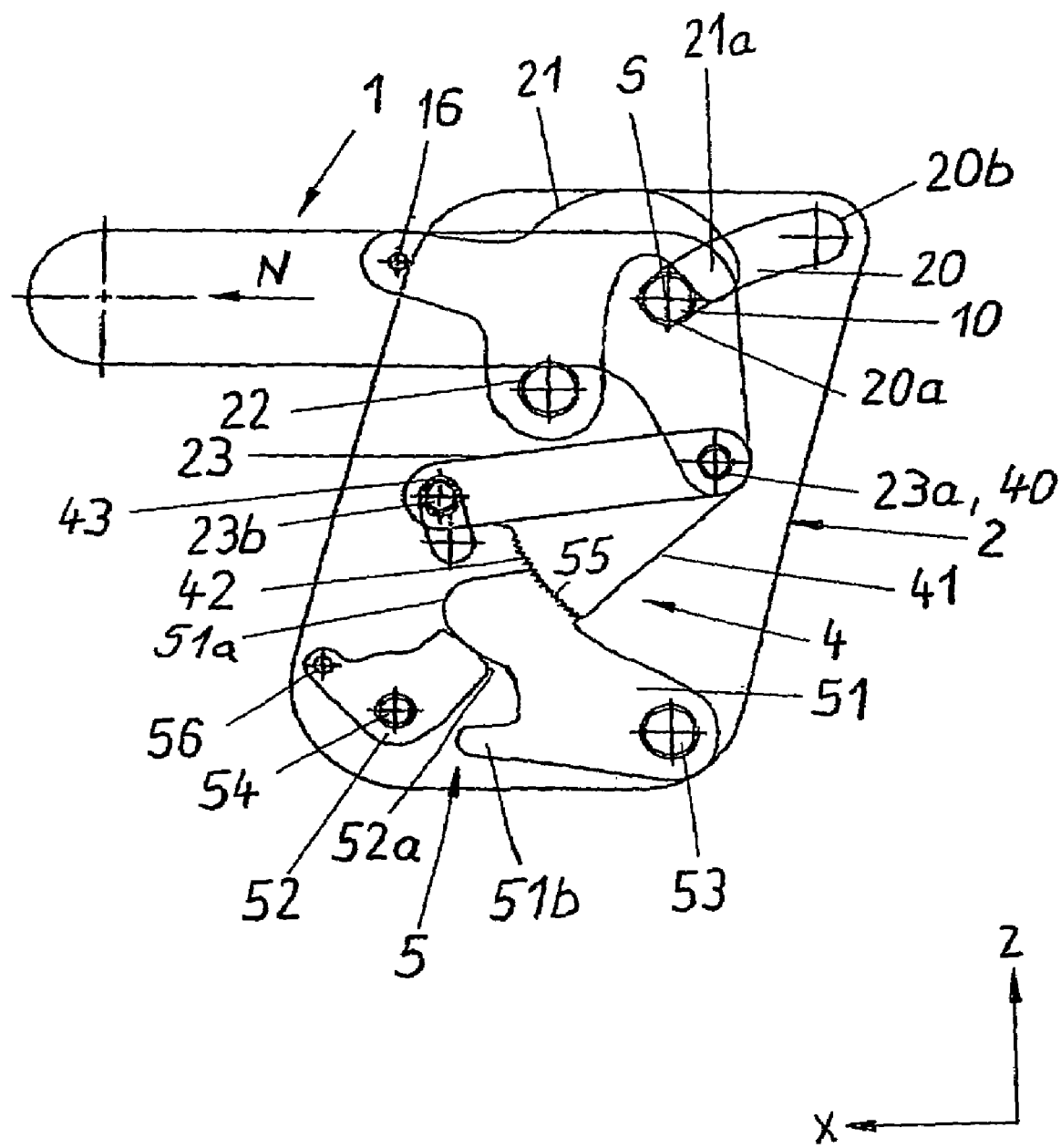
FIGS. 11a-11c show the device of FIG. 10 in a situation which corresponds to the forward-folded backrest, namely for different incline angles of the backrest in its original position of use prior to folding forwards.
Figure 11B:
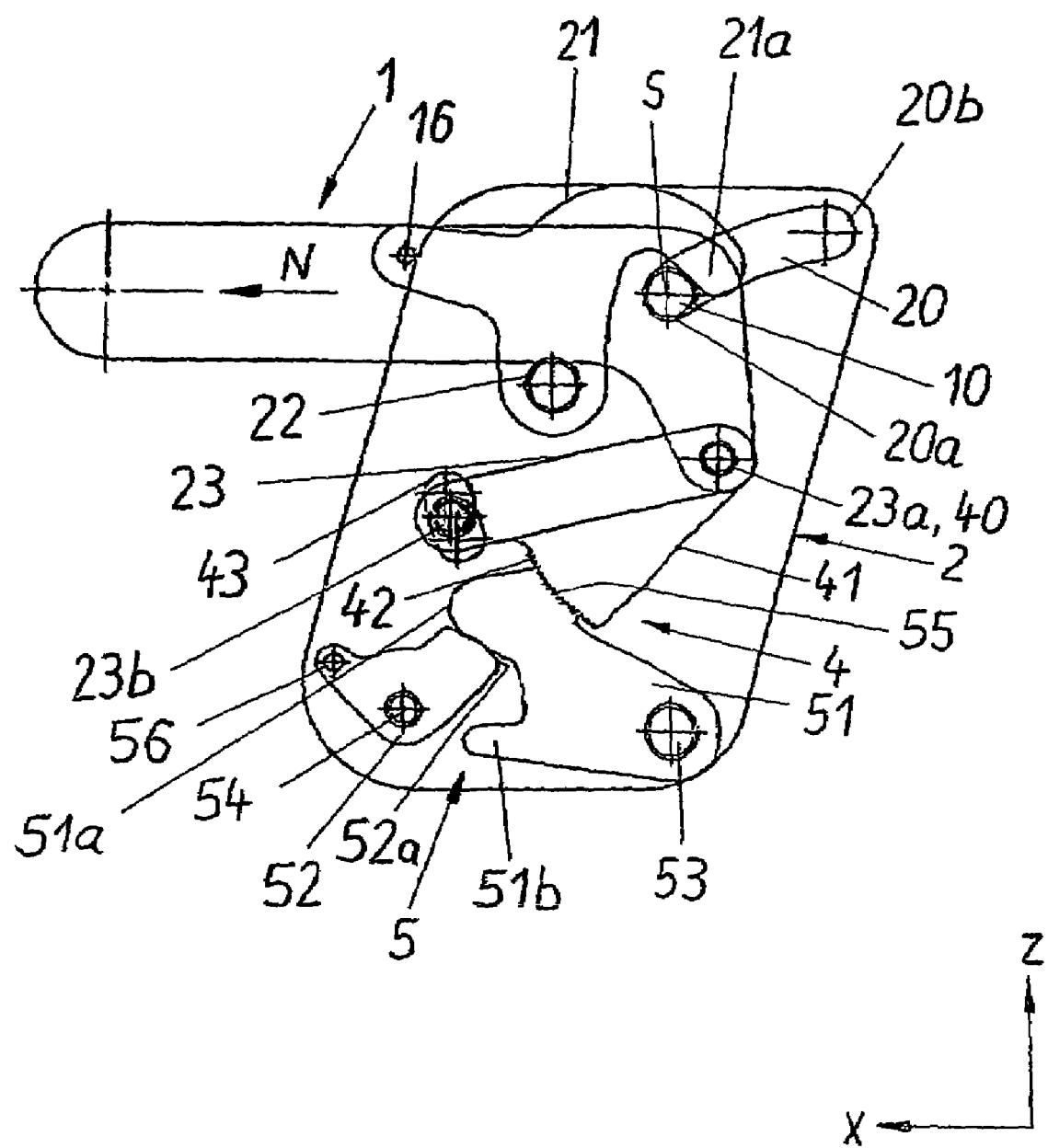
Figure 11C:
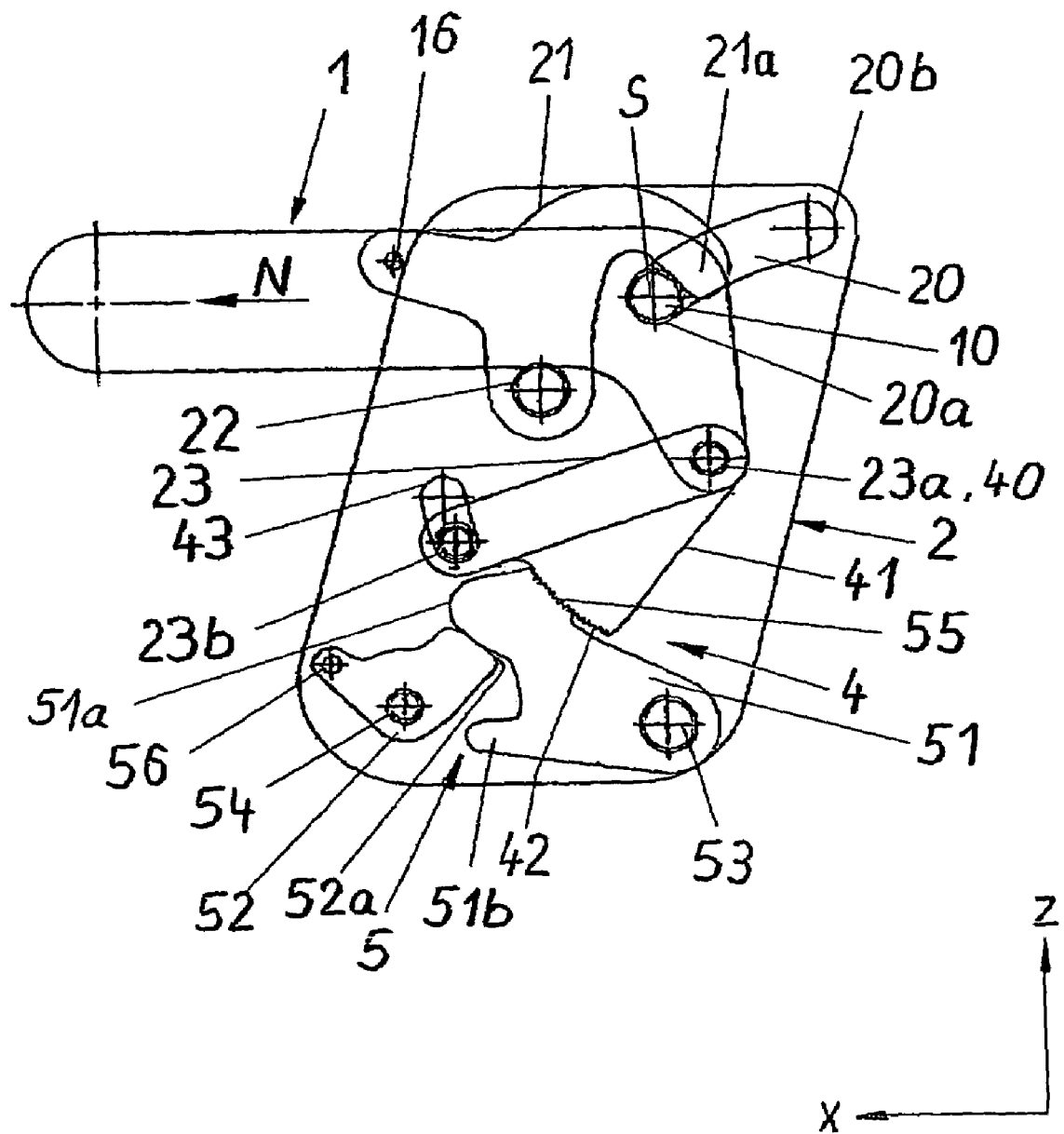

If now the backrest fitment 1 of the backrest as described previously, for example with reference to FIGS. 3a and 3b by unlocking the bearing pivot 10 and then folding the backrest forwards, is folded forwards from its upright position shown in FIG. 10 (corresponding to a useful position of the backrest) into a substantially horizontal position (corresponding to a position of the backrest folded down onto the seat surface), then the axis formed by the one connecting point 23a of the coupling lever 23 as well as the axis formed by the bearing point 40 of the adjustment lever 41 hereby overlap, as shown in FIGS. 11a to 11c, and thus coincide.

FIGS. 11a to 11c each show the arrangement of FIG. 10 after folding the backrest forwards down onto the seat surface, corresponding to a substantially horizontal alignment of the backrest fitment 1. FIGS. 11a to 11c thereby differ in the setting of the incline of the backrest fitment 1 (and thus of the backrest) before folding forwards into the horizontal position. These different settings can be seen from the different angular position of the adjustment lever 41 in FIGS. 11a, 11b and 11c.

The setting of the adjustment lever 41 illustrated in FIG. 11a (and fixed by means of the locking device) corresponds to a very steep incline of the backrest fitment 1 backwards in its useful position (prior to folding forward in the horizontal position illustrated in FIG. 11a). The setting of the adjustment lever 41 illustrated in FIG. 11b corresponds to a mean incline of the backrest fitment 1 backwards in its useful position (prior to folding forward in the horizontal position illustrated in FIG. 11b), namely exactly to that incline N of the backrest fitment 1 in its useful position as shown in FIG. 10. In FIG. 10 the adjustment lever 41 is located in the same angular position as in FIG. 11b. FIG. 11c finally shows a backrest fitment 1 folded forwards and which prior to folding was aligned practically vertical, i.e. parallel to the vehicle vertical axis.

It is clear from FIGS. 11a to 11c that the axis defined by the one connecting point 23a of the coupling lever 23 as well as the axis defined by the bearing point 40 of the adjustment lever 41 overlap in all three cases, i.e. independently of whether the backrest fitmerit 1 before folding forwards was in a very steep rearwardly inclined position (as in the case of FIG. 11a) or in a position with mean incline backwards (as in the case of FIG. 11b) or in a practically vertical alignment with just a slight incline (as in FIG. 11c). In all three cases the one upper connecting point 23a of the coupling lever on folding the backrest forwards has occupied at the end a position in which it is positioned underneath the bearing point 40 of the adjustment lever 41 (on the other side of the support plate 2). This is achieved in that the said connecting point 23a and the bearing point 40 lie on a circular path with a defined radius R about the pivotal axis S of the backrest fitment 1 and that at the beginning and at the end of the folding movement of the backrest from a useful position into its forward-folded position this pivotal axis S is positioned each time at the same end 20a of the guide path 20, thus at exactly the same spot on the support plate 2.

With the arrangement illustrated in FIG. 10 and explained in further detail with reference to FIGS. 11a to 11c it is thus reached that the backrest fitment 1 and thus the backrest R after folding down onto the seat surface independently of the inclined angle which they had prior to folding forwards, each time are positioned substantially horizontally in the same position above the seat surface of the corresponding vehicle seat. Thus a backrest which originally had a very steep rearwardly inclined rake angle can thus also be folded forwards directly onto the seat surface without previously having to move the backrest into a substantially vertical useful position.

The invention claimed is:

1. A seat arrangement for a motor vehicle seat, comprising:
   a seat base which defines a seat surface for a vehicle occupant and extends in a longitudinal direction of the seat; and
   a backrest, wherein the backrest is adjustable in the longitudinal direction of the seat relative to the seat base by a lever arrangement, wherein the lever arrangement is formed by two spaced apart articulated levers, wherein each lever has a first and second end, wherein each lever is attached on the first end to a support plate displaceable together with the backrest, and on the other end is adapted to attach to a floor unit of a motor vehicle.

2. The seat arrangement according to claim 1, wherein the longitudinal direction of the seat extends along a longitudinal axis of the vehicle in relation to the position of the seat arrangement installed in a motor vehicle.

3. The seat arrangement according to claim 1, wherein the two spaced apart articulated levers of the lever arrangement are parallel to each other.

4. The seat arrangement according to claim 1, wherein the backrest is additionally movable in the longitudinal direction of the seat by a longitudinal guide.

5. The seat arrangement according to claim 1, wherein the backrest is movable by the lever arrangement into at least two different longitudinal positions, which longitudinal positions are lockable.

6. The seat arrangement according to claim 1, wherein the lever arrangement for moving the backrest in the longitudinal direction of the seat engages on a structural frame unit on which the backrest is mounted.

7. The seat arrangement according to claim 1, wherein the backrest is foldable about a pivotal axis onto the seat surface.

8. The seat arrangement for a motor vehicle seat according to claim 7, wherein the pivotal axis is moved along a predetermined path as the backrest is folded forward onto the seat surface.

9. The seat arrangement according to claim 8, wherein the pivotal axis is moved on a closed path as the backrest is folded forward.

10. The seat arrangement according to claim 9, wherein as the backrest is folded forward the pivotal axis is moved from one end to another end of an open path curve and back to the one end of the path curve.

11. The seat arrangement according to claim 8, wherein as the backrest folds forward the pivotal axis is moved at least during part of the folding movement along a direction which is substantially opposite the direction of the folding movement.

12. The seat arrangement according to claim 8, wherein the seat surface is formed by a seat cushion mounted on the seat base.

13. The seat arrangement according to claim 7, wherein the pivotal axis is formed by a physical structural unit of the seat arrangement.

14. The seat arrangement according to claim 7, wherein the pivotal axis is formed by a bearing axis through which the backrest is mounted on a structural frame unit.

15. The seat arrangement according to claim 7, wherein the pivotal axis is automatically guided along a predetermined path as the backrest is folded forward.

16. The seat arrangement according to claim 15, wherein the pivotal axis is automatically guided by a guide device which extends along the predetermined path.

17. The seat arrangement according to claim 16, wherein the guide device is formed by a guide slide.

18. The seat arrangement according to claim 15, wherein the pivotal axis is automatically guided by a guide element through which the pivotal axis is connected to a structural frame unit and which is moved as the backrest is folded forward.

19. The seat arrangement according to claim 18, wherein the guide element is longitudinally extended.

20. The seat arrangement according to claim 18, wherein the guide element comprises a guide lever.

21. The seat arrangement according to claim 7, wherein the backrest is connected additionally outside of the pivotal axis for articulation to a structural frame unit.

22. The seat arrangement according to claim 21, wherein the backrest is connected outside of the pivotal axis to the structural frame unit through a coupling element which extends from the backrest to the structural frame unit and is moved as the backrest rest folds forward.

23. The seat arrangement according to claim 22, wherein the coupling element comprises a coupling lever.

24. The seat arrangement according to claim 21, wherein the backrest is connected outside of the pivotal axis to the frame unit through a guide device which guides a section of the backrest as it folds forward.

25. The seat arrangement according to claim 24, wherein the guide device comprises a guide slide.

26. The seat arrangement according to claim 21, wherein movement of the pivotal axis along a predetermined path as the backrest folds forward is controlled through the interaction of the backrest with the structural frame unit outside of the pivotal axis.

27. The seat arrangement according to claim 21, wherein the pivotal axis is automatically guided along a predetermined path by one of a guide device extended along this path and by a guide element through which the pivotal axis is connected to the structural frame unit, and the movement of the pivotal axis along the predetermined path is controlled by one of a coupling element and a guide device, by which the backrest is connected to the structural frame unit outside of the pivotal axis.

28. The seat arrangement according to claim 7, further comprising a locking mechanism for locking the pivotal axis in a position which corresponds to at least one of a backrest raised up in the useful position and in a position which corresponds to a backrest folded forward down onto the seat surface.

29. The seat arrangement according to claim 28, wherein the locking mechanism for locking the pivotal axis comprises a locking lever.

30. The seat arrangement according to claim 7, wherein an adjusting device is provided to set an incline of the raised-up backrest between different useful positions.

31. The seat arrangement according to claim 30, further comprising a locking device for locking a previously set incline of the backrest.

32. The seat arrangement according to claim 31, wherein the locking device comprises one of the self-locking design of the adjusting device and a brake associated with the adjusting device.

33. The seat arrangement according to claim 31, further comprising a separate locking device which interacts with the adjusting device.

34. The seat arrangement according to claim 33, wherein the locking device comprises a primary locking element which for locking the adjusting device acts on same, and a secondary locking element with which the primary locking element is lockable in a position in which it acts on the adjusting device.

35. The seat arrangement according to claim 34, wherein the secondary locking element brings the primary locking element out of engagement with the adjusting device in order to be able to change the incline of the backrest.

36. The seat arrangement of claim 1, wherein the backrest is movable by the lever arrangement into two different longitudinal positions, which longitudinal positions are lockable.

* * * * *

UNITED STATES PATENT AND TRADEMARK OFFICE
CERTIFICATE OF CORRECTION

PATENT NO.        : 7,252,337 B2  
APPLICATION NO.   : 10/521114  
DATED             : August 7, 2007  
INVENTOR(S)       : Jochen Hofmann et al.

It is certified that error appears in the above-identified patent and that said Letters Patent is hereby corrected as shown below:

On the Title Page

| | |
|---|---|
| Item (86) § 371 (c)(1), (2), (4) Date | Delete "Jan. 12, 2005", Insert --Jan. 11, 2005-- |
| Item (57) Abstract, line 4 | Delete "back rest", Insert --backrest-- |
| Item (57) Abstract, line 5 | Delete "back rest", Insert --backrest-- |

In the Claims

| | |
|---|---|
| Column 12, line 64, Claim 22 | Delete "rest" |

Signed and Sealed this

Fifteenth Day of April, 2008

JON W. DUDAS  
*Director of the United States Patent and Trademark Office*